(12) United States Patent
Leigh

(10) Patent No.: US 6,809,651 B2
(45) Date of Patent: Oct. 26, 2004

(54) PROTECTIVE BEACON

(75) Inventor: Michael Leigh, Blackpool (GB)

(73) Assignee: Benfell's Limited, Lancashire (GB)

( * ) Notice: Subject to any disclaimer, the term of this patent is extended or adjusted under 35 U.S.C. 154(b) by 7 days.

(21) Appl. No.: 10/415,580

(22) PCT Filed: Oct. 30, 2001

(86) PCT No.: PCT/GB01/04798

§ 371 (c)(1),
(2), (4) Date: Apr. 30, 2003

(87) PCT Pub. No.: WO02/37437

PCT Pub. Date: May 10, 2002

(65) Prior Publication Data

US 2004/0036628 A1 Feb. 26, 2004

(30) Foreign Application Priority Data

Oct. 30, 2000 (GB) .............................................. 0026512

(51) Int. Cl.$^7$ ........................... B64F 1/28; G08B 21/00; F16K 35/00
(52) U.S. Cl. ................ 340/686.6; 340/435; 340/436; 141/94; 251/89; 137/38
(58) Field of Search ................................. 340/435, 436, 340/572.3, 686.1–686.6; 141/94; 137/38, 39, 45, 46; 251/65, 89

(56) References Cited

U.S. PATENT DOCUMENTS

| | | | | |
|---|---|---|---|---|
| 4,464,129 A | * | 8/1984 | Vancheri et al. | .............. 441/16 |
| 5,119,841 A | * | 6/1992 | McGill | ........................ 137/38 |
| 5,588,636 A | * | 12/1996 | Eichholz et al. | ....... 251/129.04 |
| 6,023,218 A | * | 2/2000 | Tremblay | ................. 340/425.5 |
| 6,237,647 B1 | * | 5/2001 | Pong et al. | ................... 141/94 |

FOREIGN PATENT DOCUMENTS

| | | | | |
|---|---|---|---|---|
| DE | 299 22 828 U 1 | | 5/2000 | |
| GB | 2 318 398 A | | 4/1998 | |
| GB | 2318398 A | * | 4/1998 | ............. B64F/1/28 |

* cited by examiner

Primary Examiner—Jeffery Hofsass
Assistant Examiner—Anne V. Lai
(74) Attorney, Agent, or Firm—Dinsmore & Shohl LLP

(57) ABSTRACT

A portable beacon (8) for deterring damaging access to a deactivatable hazard comprises means for deactivating the hazard in the event of actual or impending damaging access to the hazard, deterrence means (12) and sensors (13, 23, 24) for sensing when damaging access is impending or actually occurring.

45 Claims, 4 Drawing Sheets

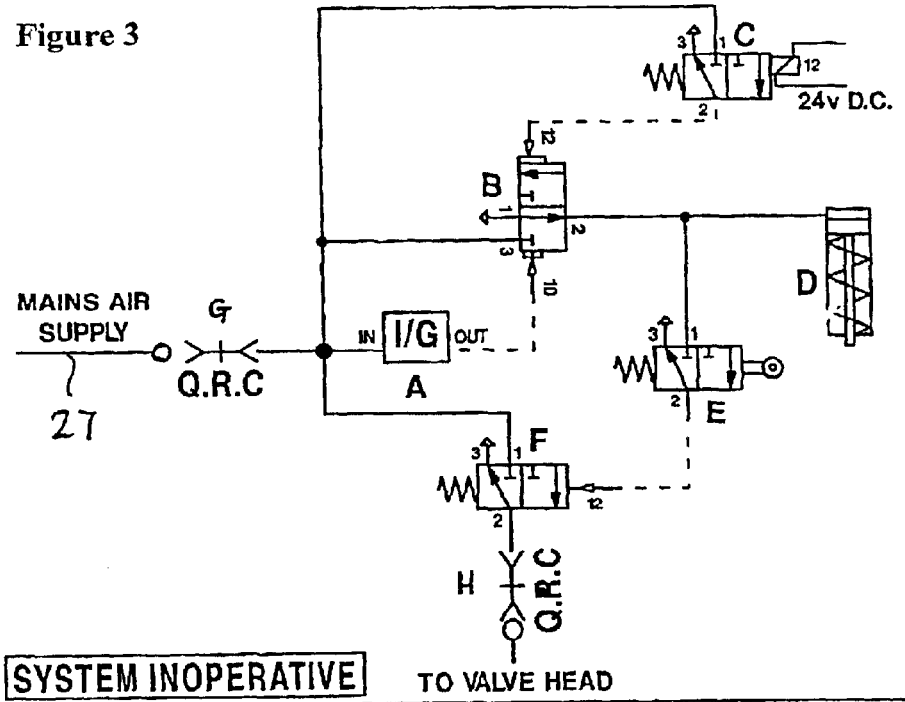
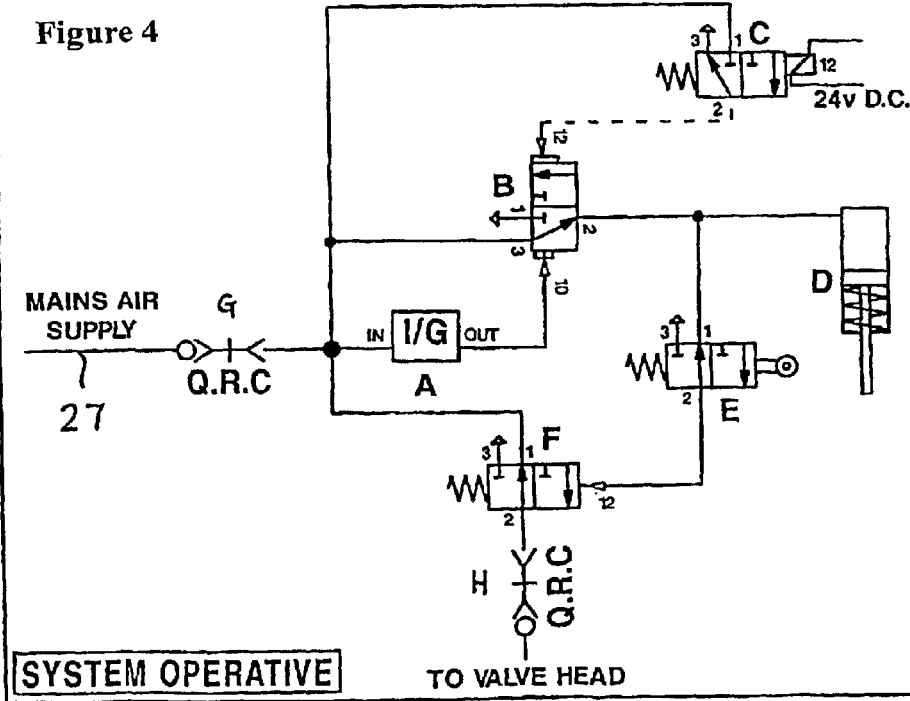

PROTECTIVE BEACON

This invention relates to a protective beacon for warning of potential hazards. Specific aspects of the invention relate to the hazards presented in use of aircraft refuelling protection systems, which systems will be used hereinafter in describing the invention and its benefits.

Aircraft refuelling systems in use at most substantial airports incorporate an underground hydrant system including a network of fuel storage tanks buried in the airport apron. The storage tanks communicate through pipework and valves in a ring main system leading to a plurality of refuelling pits. Each refuelling pit contains a valved pit head and a removable cover that, when in place, lies flush with the surrounding surface of the apron. When removed, the cover permits access to the pit head so that a nearby aircraft can be refuelled by fuel flowing through the pit head.

The underground refuelling network is pressurised and maintains fuel pressure through a series of automatic inline pumps. These pumps operate automatically in the event of a detected drop in fuel pressure, for instance when an aircraft begins to take fuel from the refuelling network, so that there is sufficient pressure to refuel more than one aircraft simultaneously.

In aircraft refuelling systems of this type, a refuelling support vehicle, or hydrant dispenser, provides the link between an aircraft and a refuelling pit. The purpose of the hydrant dispenser is to monitor the quantity and quality of fuel dispensed to the aircraft. Accordingly, the hydrant dispenser is positioned adjacent the aircraft's refuelling point to meter and filter fuel flowing from the pit head to the aircraft, for which purpose the hydrant dispenser is connected to the pit head by a fuelling pipe or hose and to the aircraft by another pipe or hose. The hydrant dispenser may also carry these pipes on spools when not in use, together with any attachments, couplings or connectors necessary to attach the pipes to the aircraft and the pit head.

The operator of the hydrant dispenser is responsible for the operation, integrity and safety of the vehicle and of the pipes and couplings constituting the fuel line or conduit between the aircraft and the pit head.

Accidents can happen on airport aprons and if they do, they can have serious consequences in view of the presence of fuel-laden pipes and adjacent fuel-laden aircraft. The vehicles and machinery used on airport aprons are often large with invisible extremities, and so are difficult for their operators to position accurately. This increases the risk of collision with refuelling equipment during refuelling. Furthermore the environment in which aircraft refuelling takes place is often noisy and physically demanding, making it difficult to hear shouted warnings that a collision is imminent. All of these factors contribute to the likelihood of a fuel pipe being snagged and fractured, or of the coupling between the pipe and the pit head being knocked and the seal broken.

The most likely section in a refuelling network for a collision to occur and cause a fuel leak is in the link between the hydrant dispenser and the refuelling pit. The coupling at the pit head and the refuelling pipe that leads from the coupling to the hydrant dispenser do not rise much above ground level and are relatively small compared to the scale of the surrounding machinery, making them easy to miss.

It might be thought that even if a collision did occur and cause a fuel leak, it would simply be a matter of closing a valve to prevent, contain or extinguish a resulting fire by starving it of fuel. Unfortunately, this is not so. It is not practical for the pressure control means of the system to differentiate between a normal drop in fuel pressure that occurs during refuelling and a pressure drop that might have occurred due to a leakage in the refuelling network. In fact, it has happened that after an accident has caused a leak in the refuelling network, the pressure control means of the system has switched on additional pressurisation pumps in an attempt to restore fuel pressure in the ring main system, thereby worsening the already dangerous situation by pumping ever more fuel to the site of the leak. A simple fracture in an aboveground fuel conduit can therefore cause an uncontrolled gusher of fuel, which will almost certainly catch fire. The potentially catastrophic consequences of this happening close to fuel-laden aircraft need no elaboration.

Current practice to prevent such accidents involves placing one or more warning flags and warning cones around the vicinity of a refuelling operation when the hydrant dispenser has a live fuel connection. Further, current practice involves providing a refuelling operator with a lanyard that the operator can pull as a last resort to close the valve on the pit head to stop the flow of fuel in an emergency. The operator must therefore keep a close watch for moving vehicles around the aircraft and the refuelling area so that if the operator fears that a collision may occur, he pulls the lanyard in an attempt to shut down the refuelling pit before the collision actually happens.

The current practice as described above is unsatisfactory as it relies upon alertness of the refuelling operator and human intervention to pull the lanyard in time. So, it fails if the operator is incapacitated, slow or unobservant, and also because the lanyard itself might not work in an emergency situation. For example, instances have been documented of a vehicle colliding with a refuelling pipe or coupling and the lanyard being trapped beneath a wheel of the vehicle in a manner that prevents the valve being closed by pulling on the end of the lanyard. Also, whilst pit heads have a fail-safe design, it is possible that a major collision could prevent the lanyard closing the valve at all.

The invention embodies a principle, namely that a portable beacon can be positioned to deter damaging access to a deactivatable hazard, the beacon including means for deactivating the hazard in the event of impending damaging access to the hazard and proximity sensor means responsive to the proximity of a threat, wherein the proximity sensor means is responsive to the distance of the threat from the beacon. The principle can also be expressed as a method of protection against a deactivatable hazard, the method comprising positioning a portable beacon to deter damaging access by a threat to the hazard and the portable beacon deactivating the hazard in response to proximity of the threat to the beacon.

Thus, the invention has application beyond the field of fuel supply and storage systems but it has particular benefits in that field. Against this background, therefore, the invention can be expressed as a beacon adapted to deter damaging access to a fuel conduit, the beacon including means co-operable with the conduit to shut off fuel flow through the conduit in the event of actual or impending damaging access to the conduit. The invention can also be expressed as a beacon adapted to deter damaging access to a fuel conduit, the beacon including a valve for exhausting pressurised air to atmosphere from an air line associated with the conduit to shut off fuel flow through the conduit controlled by the air line.

Again, the fuel supply and storage aspect of the invention can be expressed as a method of preventing uncontrolled leakage of fuel through collision damage to an exposed conduit in a fuel supply or storage system, the method comprising positioning a portable beacon to deter collision by a threat with the conduit and in the event of actual or impending collision with the beacon, the beacon co-operating with the conduit to shut off fuel flow through the conduit in response to proximity of the threat to the beacon.

The invention extends to a safety system including a deactivatable hazard and a portable beacon as defined herein, especially when the beacon is positioned to deter damaging access to the hazard and is linked to the hazard for the purpose of deactivation.

The invention also embraces a fuel supply or storage system, the system comprising a portable beacon as defined herein adapted to deter collision with an exposed fuel conduit, the beacon including means co-operable with the conduit to shut off fuel flow through the conduit in the event of actual or impending collision with the beacon to prevent uncontrolled leakage of fuel through collision damage to the conduit. The advantages of the invention are particularly apparent where the fuel supply or storage system is adapted to refuel aircraft.

Further beneficial but optional features are set forth in the subsidiary claims appended to this description and in the specific description that now follows. Accordingly, in order that this invention can be more readily understood, reference will now be made, by way of example, to the accompanying drawings in which:

FIG. 3 is a circuit diagram showing the internals of a protective beacon according to a second embodiment in an inoperative state prior to being made ready for use;

FIG. 4 is a circuit diagram of the beacon of FIG. 3 in an operative state ready for use.

Figure 1:
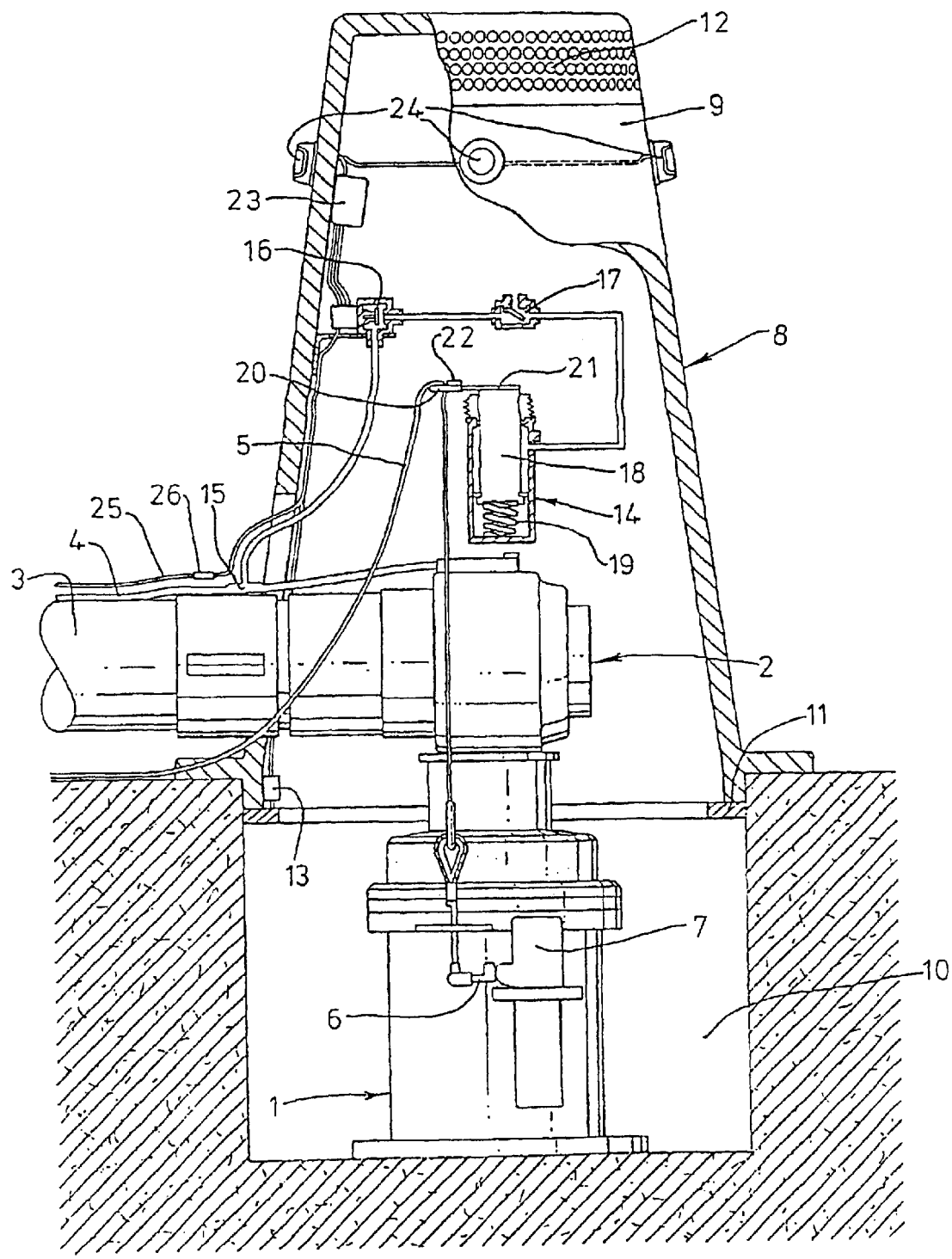
FIG. 1 is a part-sectioned side view of a preferred embodiment of the invention, showing a beacon seated atop a refuelling pit in use.

Referring firstly to FIG. 1 of the drawings, a pit head of standard design and layout comprises a circular recess (10) formed in the surrounding concrete or tarmac of an airport apron. A pit hydrant (1) rises from the base of the recess (10) to near the ground level defined by the apron, so that when the pit head is not in use, a substantially flush-fitting cover (not shown) can be secured over the recess to protect the hydrant. However, in use as illustrated, the cover is removed and a coupling (2) is attached to the hydrant.

The coupling (2) is one end of a fuel pipe (3) or hose that lies generally parallel to the apron, for which purpose the coupling turns the flow of fuel from the hydrant (1) through 90° from the vertical to the horizontal. As is well known in the art, the fuel pipe (3) leads to a hydrant dispenser parked on the apron and from there to an adjacent aircraft's fuel inlet. These are omitted from the drawings for clarity.

The coupling (2), too, is of standard design. It receives an air feed conveying pressurised air from the hydrant dispenser that is used to open the underground valve in the hydrant so that fuel can flow along the fuel pipe (3) when the coupling (2) connects the fuel pipe (3) to the hydrant (1) and the hydrant dispenser is ready to meter and filter the fuel. The air feed runs parallel to the fuel pipe in a narrow air line (4), typically 6 mm in diameter and containing air at 120 psi, although these figures are not critical.

As has been mentioned, a standard hydrant such as that shown in FIG. 1 contains a shut-off device operable by a lanyard (5). The lanyard (5) is shown in FIG. 1 terminating in a lever (6) that operates the shut-off device (7) when the lanyard (5) is pulled upwardly.

All of the abovementioned features are part of the prior art and, moreover, describe a wholly standard combination of pit head, coupling and fuel pipe. They have been described first to put the invention into context and also to show how the invention can be used in standard applications with minimal modification and hence no major capital investment. It will also be apparent that the lanyard is left in place, enabling an operator to shut down the fuel feed mechanically in the traditional way if needs be.

Moving on to the features of the invention, a protective beacon (8) is seated on top of the recess of the pit head, thus covering the hydrant (1) and substantially covering the coupling (2). The beacon (8) comprises a hollow frusto-conical outer shell (9) whose circular-section side wall is continuous from its bottom edge near the rim of the recess to the flat horizontal top of the shell, save for an aperture provided in one side. This aperture accommodates a minor downstream portion of the coupling (2) that leads into the fuel pipe (3), and is open to the bottom edge of the shell to allow the beacon to be placed on top of the assembled coupling (2) and hydrant (1).

The bottom edge of the shell (9) seats into the surrounding rim of the recess (10) and an outwardly-projecting flange (11) lies outside the recess (10) on the surrounding apron to limit the degree of insertion of the shell (9) into the recess (10). Accordingly, the shell (9) mates with the recess when the beacon (8) is properly seated over the refuelling pit so that the beacon (8) does not move under wind pressure or when lightly touched.

The height of the shell (9) is approximately 1 meter and the diameter of its base is approximately 60 cm, to suit standard pit head dimensions and to combine good visibility with easy portability.

The material chosen for the shell (9) is not in itself important, save that it should withstand the typical chemical and physical attacks that can be suffered in an airport apron environment while being lightweight, inexpensive to produce and simple to keep clean. High density heavy-duty moulded plastics such as are used to manufacture traffic cones are currently preferred. The shell should be of a highly-visible external color such as orange, preferably in self-colored plastics, supplemented as necessary by reflective attachments.

In the preferred embodiment illustrated, visibility of the beacon is enhanced by an array of high-visibility, very high-brightness LEDs (12) that extends in a band around the shell (9) of the beacon (8) near its top. These LEDs (12) suitably flash or strobe when in use. To viewers on the apron, the LEDs (12) are visible from all around the beacon in a 360° field of view but to viewers from above, notably aircraft in flight, the LEDs (12) cannot be seen. This is to comply with airfield regulations.

The LEDs (12) are switched on by a seating sensor (13) situated inside the hollow shell (9) of the beacon (8) at its bottom edge. The seating sensor (13) is a microswitch including an actuating element that bears against a shoulder within the rim of the recess when the shell is correctly seated in the recess. When the actuating element is depressed by the shoulder, the microswitch closes a circuit that powers the LEDs (12), which by illuminating therefore serve to confirm that the beacon (8) is correctly in place. To guarantee correct seating, there could be more than one seating sensor spaced angularly around the bottom edge of the shell, all of which have to bear against the shoulder to close the circuit that powers the LEDs.

A suitable microswitch is available from RS Components at http://rswww.com.

The hollow shell (9) of the beacon (8) also contains a pneumatic actuator (14) powered by compressed air bled from the air feed (4) through a T-junction (15). When the beacon is placed over a refuelling pit, the operator push-fits an air line from the beacon onto the T-junction. The air line leads to the pneumatic actuator (14) via an air switch (16) which, unless energised, is normally closed to permit the passage of air through the switch, and a 3/2 valve (17) which, unless energised, is normally open to bleed that air to atmosphere.

A suitable 3/2 valve is made by Parker Pneumatic, part number PXB-B1921 with a switch body PXB-B2021. An alternative solenoid-activated 3/2 valve is made by Schrader. Both are available from EPIC at www.epic-catalogue.com. The signal required by each type of 3/2 valve is well documented and consistent with safety in a refuelling environment.

When placing the beacon (8) over a refuelling pit, the operator activates a timer (not shown) by pressing a suitably-placed touch button. This energises and closes the 3/2 valve (17) while the timer is active which allows air to pressurise the pneumatic actuator (14), thus arming the actuator by moving the actuator piston (18) downwardly against the bias of a spring (19) within the actuator body. Pressurised air can now also flow beyond the T-junction (15) along the air line to the coupling (2), thus causing the underground valve in the hydrant to open.

During a timeout period determined by the timer (for example, one minute from pressing the button), the operator must connect the lanyard (5) to a cleat (20) mounted on an arm (21) attached to the downwardly-retracted piston (18) of the actuator. A microswitch (22) on the arm (21) detects the presence of the lanyard (5) in the cleat (20) and, when closed by the presence of the lanyard (5), energises the 3/2 valve (17) to keep the valve closed after the timer has deactivated. However, if the timeout period expires without the lanyard (5) being put into the cleat (20), the 3/2 valve (17) opens. By virtue of the non-energised air switch (16) that allows air to flow from the T-junction (15) to atmosphere via the 3/2 valve (17), this depressurises the air line leading to the coupling and so shuts off the fuel supply.

It will be noted from FIG. 1 that the hollow shell (9) of the beacon (8) also contains a vibration sensor (23) that can energise and hence open the air switch (16) to block the flow of air to the pneumatic actuator (14) when the vibration sensor (23) detects movement characteristic of the beacon (8) being knocked by a vehicle or other colliding body. This depressurises the pneumatic actuator (14) which pulls the lanyard (5) and hence shuts down the refuelling pit mechanically. Simultaneously, the microswitch (22) on the arm causes the 3/2 valve (17) to open, which depressurises the air line leading to the coupling (2) and shuts down the hydrant dispenser.

Figure 2:
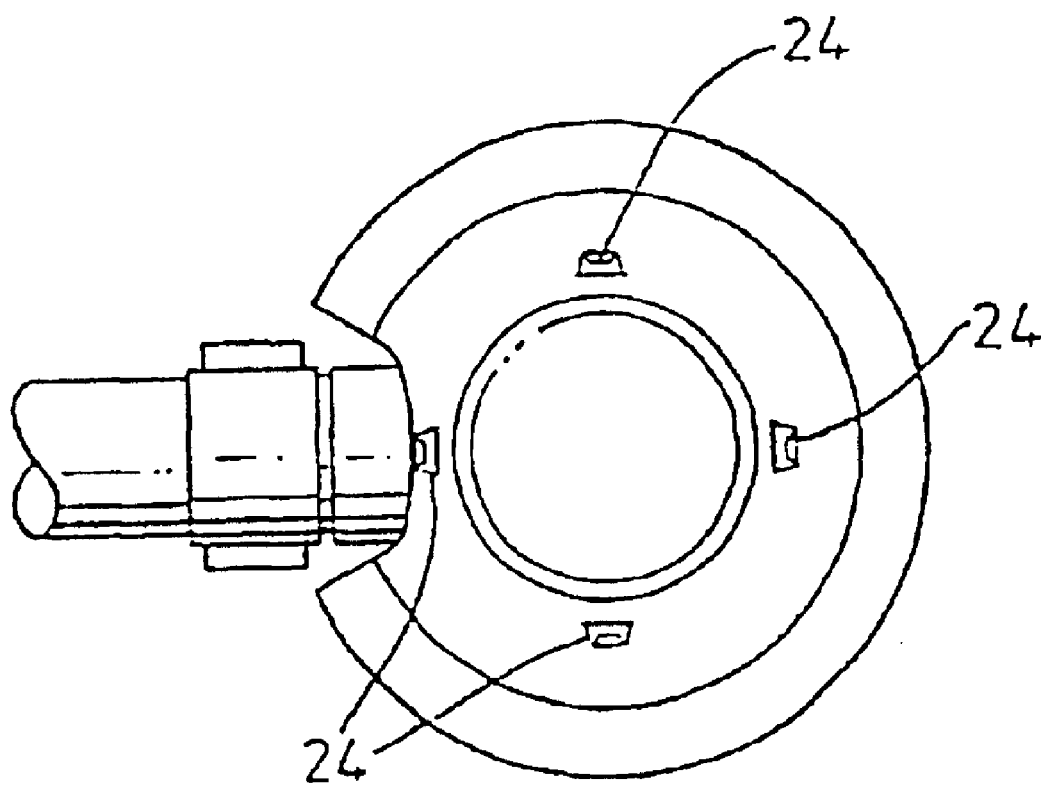
FIG. 2 is a plan view corresponding to FIG. 1 but to a reduced scale, showing the coverage of proximity sensors disposed around the beacon.

It will therefore be clear to those skilled in the art that the fuel supply is shut down automatically in the event of a collision with the beacon (8), before any damage and consequential fuel leakage can occur. Of course, it is much preferred that the beacon (8) does not suffer a collision at all and that its immediate environs are protected too. Accordingly, apart from its high-visibility features such as the LED array (12) and its color, reflectivity and size, the beacon of FIG. 1 also includes proximity sensors (24) disposed in an equi-angularly spaced array around the upper external periphery of the beacon (8), just under the LED array. As best shown in FIG. 2, four proximity sensors (24) at 90° to each other can together give 360° coverage around the beacon.

The proximity sensors (24) are able to detect an object when it encroaches into a sensing field at a predetermined range of, say, 1 m and, in response to such detection, to set off a warning siren (not shown) that provides a warning audible to those near the beacon (8). This may, for example, be enough to prevent a driver inadvertently reversing a vehicle into the beacon (8) and will, at least, alert the refuelling operator that there is a risk of collision in case the operator does not notice how close the vehicle is to hitting the beacon (8). It is envisaged that a siren of approximately 130 dB could be accommodated within the beacon (8) and would be adequately loud for the task. The proximity sensors (24) may be of ultrasonic type, similar to those used on the front or rear of vehicles to provide distance information while parking.

Alternatively or in addition to a warning siren, a wireless signal such as a low-power radio or infra-red signal may be sent out from an appropriate transmitter (not shown) within the shell. That signal can be picked up by a corresponding receiver to provide the operator of the receiver, such as a driver of a suitably-equipped vehicle, with a remote warning or proximity to the beacon. The remote warning can take both visual and audible forms, or can be used to trigger further safety systems such as the automatic braking of vehicles that feature a warning receiver as a component of an integrated safety system. However, it is acknowledged that a signal warning system would only be entirely safe if all vehicles on the airport apron were suitably equipped. Accordingly, a signal warning system is envisaged only as a back-up to the warning and shut-off facilities described above, in applications where the capital cost of reequipping vehicles is acceptable.

In the embodiment illustrated, electrical power for the beacon is derived from the hydrant dispenser via a low-voltage power supply lead (25) running parallel to the fuel pipe (3) and the air feed (4). In this case, the operator simply uses a waterproof push-connector (26) to connect the cone (8) to the power supply lead (25). However, this form of power supply is not critical to the invention. For example, power may be supplied from a suitably-adapted refuelling pit, although this option is less preferred in view of the need for adaptation. More preferably, there may be an internal battery which is ideally rechargeable. If rechargeable, the internal battery is advantageously rechargeable during daylight by solar cells (not shown) mounted on the outside of the shell (9). The provision of a battery would enable the beacon (8) to be self-sufficient from any support vehicles.

As the electrical systems mentioned above operate on low power, this minimises electrical ignition sources for any fuel vapours present. The high proportion of pneumatic components is similarly advantageous.

Many other variations and additional options are possible within the inventive concept. For example, the air switch (16) can be responsive to inputs from the seating sensor (13) and/or from the proximity sensors (24) in addition to, or as an alternative to, input from the vibration sensor (23). The skilled reader will appreciate that collision with the beacon (8) will tend to unseat the beacon (8) from the refuelling pit by tilting the beacon (8) and hence lifting the seating sensor (13), or one of a preferred array of seating sensors, away from the shoulder (11) within the recess (10) of the pit. Aside from opening the circuit that powers the LED array (12), this can be used to trigger the air switch (16) to shut off the fuel flow.

Similarly, the proximity sensors (24) can be used to generate more than just an audible alarm or a wireless remote alarm signal: they can also be used to generate a fuel shut-off signal that triggers the air switch (16) to shut off the fuel flow. If needs be, the proximity sensors (24) can be employed to trigger an alarm when an object is at an outer threshold distance and to trigger the air switch (16) to shut off the fuel flow if the object continues to approach the beacon (8) after the alarm is triggered or crosses an inner threshold distance.

Whilst the preferred embodiment described above relies upon an audible alarm responsive to proximity, it is also possible to trigger a visible alarm additional to the usual LED display (12). This visible alarm can be provided by an auxiliary light source or by changing the display behaviour of the LED array (12).

In order that a triggering signal is reliably sent to the controlling switch, multiple vibration sensors may be employed to provide a backup signal should one or more of the vibration sensors fail.

A test facility may be incorporated into the electrical systems to provide a refuelling operator with a check of the integrity of the electrical components before a refuelling operation begins. For example, the test facility may be arranged such that when the beacon is seated in the refuelling pit, the LEDs (12) will light up only if all of the components are fully functional.

Figure 5:
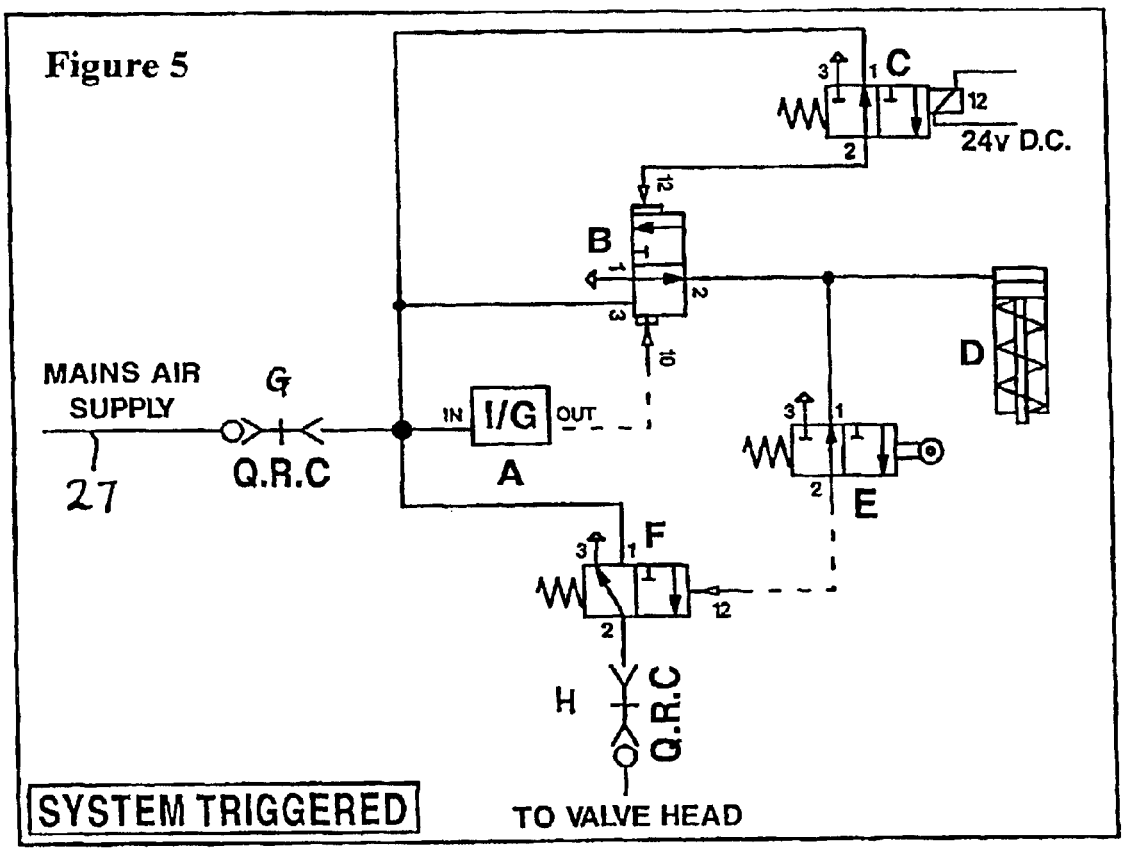
FIG. 5 is a circuit diagram of the beacon of FIGS. 3 and 4 in a triggered state after triggering of the beacon's safety shut-off mechanisms.

FIGS. 3 to 5 show a second embodiment of the invention wherein many of the electrical components of the first embodiment shown in FIG. 1 and FIG. 2 are replaced by pneumatically actuating components. This further reduces the risk of igniting flammable material.

FIG. 3 shows the beacon in the inoperative state just prior to being set up for use. The states of the valves in a priority pilot valve B, a solenoid spring valve C, a roller spring valve E and a shut-off air valve F can be noted.

To enter the operative state of FIG. 4, the refuelling operator connects a mains air supply hose (27) to a quick release connector G. Impulse generator A senses the connection of the mains air hose and responds to this pressure change by sending a two-second pulse to priority pilot valve B. The pulse sets valve B to connect port 3 to port 2 and consequently spring loaded piston D (corresponding to the pneumatic actuator (14) of the first embodiment) is held down against its bias by the passage of pressurised air through B.

When piston D is held down, this allows the refuelling operator to position a safety lanyard from the pit head in a jamming cleat on D. The lanyard and cleat correspond to features (5) and (20) of the first embodiment and are not shown here. As a result (for example by means of a microswitch like (22) of FIG. 1) the roller spring valve E is closed, connecting port 2 of E to port 1 of E and hence admitting high-pressure air to pilot spring valve F. This switches pilot spring valve F so that port 2 of F is connected to port 1 of F. Hence, pressurised air is allowed to progress to the pit head valve via a quick release connector H, which was connected to the pit head valve before the mains air supply was connected to the beacon via the quick release connector G.

Once these steps have been taken, the protective beacon is ready for use and the pit head valve has been opened by the pressurised air issuing through H.

This second embodiment of the protective beacon only has externally mounted ultrasonic distance sensors providing the triggering means for shutting down the refuelling procedure. These sensors are not shown but correspond to feature (24) of the first embodiment. Should the ultrasonic sensors detect an object within the region guarded by the ultrasonic sensors, hence triggering the system into the state shown in FIG. 5, the output from the sensors provides a 24 volt D.C. signal to the input of solenoid spring valve C, connecting port 2 of C to port 1 of C and hence admitting high-pressure air to the priority pilot valve B. This causes the priority pilot valve B to switch the connection of port 2 of valve B from port 3 to port 1. The connection of port 2 to port 1, which vents to atmosphere, causes the spring-loaded cylinder D to depressurise and hence to return to its normal position under spring bias. On returning to its normal position, the lanyard is pulled by D and this automatically closes the pit head valve.

Furthermore, the depressurisation of the air line between B and D also causes the air line between B and E to depressurise. As valve E serves at this point as an open conduit between B and F, the air line between E and F also depressurises. The loss of air pressure from E causes pilot spring valve F to revert to its normal biased state, whereupon the pressurised air in the air line between the pit head and F is vented to atmosphere through port 3 of F. Once this happens, the pit hydrant valve is closed through the removal of pressurised air, in addition to being closed through the activation of the safety lanyard.

It will be appreciated that in this second embodiment, the safety shut-off of the pit hydrant does not rely upon actual contact being made with the cone by a foreign object. Additionally, this second embodiment of the invention has an advantage over the first embodiment in that the fuel flow from the pit hydrant is automatically shut off in two ways— by the pneumatic pit head valve shut-off mechanism shutting down the pneumatically actuated pit head valve as well as the mechanical shut-off achieved through pulling the lanyard by release of D.

Many other variations are possible within the inventive concept, and the present invention may be embodied in other specific forms without departing from its essential attributes. Accordingly, reference should be made to the appended claims and other conceptual statements herein rather than to the foregoing specific description as indicating the scope of the invention.

What is claimed is:

1. A portable beacon that can be positioned to deter damaging access to a deactivatable hazard, the beacon including means for deactivating the hazard in the event of impending damaging access to the hazard and proximity sensor means responsive to proximity of a threat, wherein the proximity sensor means is responsive to the distance of the threat from the beacon.

2. The beacon of claim 1 wherein the means for deactivating the hazard is responsive to the proximity sensor means.

3. The beacon of claim 1 wherein deterrence is by visual warning.

4. The beacon of claim 3, further including means for emitting light.

5. The beacon of claim 4, further including an LED array.

6. The beacon of claim 4, wherein the light emitting means are adapted to project light only substantially horizontally in use.

7. The beacon of claim 3, further including reflector means.

8. The beacon of claim 1 wherein deterrence is by audible warning.

9. The beacon of claim 1 wherein deterrence is by wireless transmission of a warning signal.

10. The beacon of claim 1 wherein deterrence is by a warning or warning signal whose characteristics vary in accordance with the likelihood of damaging access to the hazard.

11. The beacon of claim 10, wherein the likelihood of damaging access is determined by the proximity of a threat to the beacon.

12. The beacon of claim 11, wherein the likelihood of damaging access is determined by the distance of the threat from the beacon.

13. The beacon of claim 1 further including collision sensor means responsive to movement of the beacon.

14. The beacon of claim 13, wherein the collision sensor means is responsive to vibration of the beacon.

15. The beacon of claim 13 wherein the collision sensor means is responsive to tilting of the beacon.

16. The beacon of claim 13 wherein the means for deactivating the hazard is responsive to the collision sensor means.

17. The beacon of claim 1, further including location sensor means for sensing the location of the beacon.

18. The beacon of claim 17, wherein the location sensor means is adapted to sense location of the beacon with respect to a datum.

19. The beacon of claim 18, wherein the datum is a co-operating formation shaped to complement the beacon.

20. The beacon of claim 19, wherein the location sensor means comprises at least one microswitch positioned to sense mating engagement of the beacon and the formation.

21. The beacon of claim 1, further including manual override means for deactivating the hazard.

22. The beacon of claim 1 and being adapted substantially to surround the hazard in use.

23. The beacon of claim 22, wherein the beacon has a hollow body capable of substantially accommodating the hazard in use.

24. The beacon of claim 1 and being adapted to lie substantially above the hazard.

25. The beacon of claim 1 and being adapted to deter damaging access to a fuel conduit, the beacon including means co-operable with the conduit to shut off fuel flow through the conduit in the event of actual or impending damaging access to the conduit.

26. The beacon of claim 25, wherein the means co-operable with the conduit include pneumatic actuator means.

27. The beacon of claim 26, wherein the pneumatic actuator means is biased to shut off fuel flow through the conduit in the absence of pressurized air.

28. The beacon of claim 25 further including pressurized air bleed means connectable to an air line associated with the conduit.

29. The beacon of claim 28, further including an air switch that blocks the passage of air from the air line to the pneumatic actuator means in response to the proximity or collision sensor means.

30. The beacon of claim 25 further including means co-operable with a manual fuel shut-off associated with the conduit.

31. The beacon of claim 30, wherein the manual fuel shut off is cable operated and the beacon includes means for pulling the cable.

32. The beacon of claim 31, wherein the manual fuel shut off remains manually operable by an operator pulling the cable.

33. The beacon of claim 30 further including means responsive to failure to connect the beacon to the manual fuel shut-off to shut off the fuel flow.

34. The beacon of claim 33, further including timeout means permitting a set-up time period for connecting the beacon to the manual fuel shut-off before shutting off the fuel flow.

35. The beacon of claim 1 and being adapted to deter damaging access to a fuel conduit, the beacon including a valve for exhausting pressurized air to atmosphere from an air line associated with the conduit to shut off fuel flow through the conduit controlled by the air line.

36. The beacon of claim 1, further including means for connection to an electrical power source associated with the hazard.

37. The beacon of claim 1, further including an internal electrical power source.

38. The beacon of claim 37, further including a solar cell array for recharging the internal electrical power source.

39. A safety system including a deactivatable hazard and a portable beacon that can be positioned to deter damaging access to a deactivatable hazard, the beacon including means for deactivating the hazard in the event of impending damaging access to the hazard and proximity sensor means responsive to proximity of a threat, wherein the proximity sensor means is responsive to the distance of the threat from the beacon.

40. The system of claim 39, wherein the beacon is positioned to deter damaging access to the hazard and is linked to the hazard for the purpose of deactivation.

41. A fuel supply or storage system, the system comprising a portable beacon that can be positioned to deter damaging access to a deactivatable hazard, the beacon including means for deactivating the hazard in the event of impending damaging access to the hazard and proximity sensor means responsive to proximity of a threat, wherein the proximity sensor means is responsive to the distance of the threat from the beacon, wherein the beacon is adapted to deter collision with an exposed fuel conduit, the beacon including means co-operable with the conduit to shut off fuel flow through the conduit in the event of actual or impending collision with the beacon to prevent uncontrolled leakage of fuel through collision damage to the conduit.

42. The fuel supply or storage system of claim 41 and being adapted to refuel aircraft.

43. An airport, airfield, helipad or aircraft carrier having a fuel supply or storage system comprising a portable beacon that can be positioned to deter damaging access to a deactivatable hazard, the beacon including means for deactivating the hazard in the event of impending damaging access to the hazard and proximity sensor means responsive to proximity of a threat, wherein the proximity sensor means is responsive to the distance of the threat from the beacon, wherein the beacon is adapted to deter collision with an exposed fuel conduit, the beacon including means co-operable with the conduit to shut off fuel flow through the conduit in the event of actual or impending collision with the beacon to prevent uncontrolled leakage of fuel through collision damage to the conduit.

44. A method of protection against a deactivatable hazard, the method comprising positioning a portable beacon to deter damaging access by a threat to the hazard and the portable beacon deactivating the hazard in response to proximity of the threat to the beacon.

45. A method of preventing uncontrolled leakage of fuel caused by collision damage to an exposed conduit in a fuel supply or storage system, the method comprising positioning a portable beacon to deter collision by a threat with the conduit and in the event of actual or impending collision with the beacon, the beacon co-operating with the conduit to shut off fuel flow through the conduit in response to the proximity of the threat to the beacon.

* * * * *